(12) United States Patent
Russell et al.

(10) Patent No.: US 7,150,004 B2
(45) Date of Patent: Dec. 12, 2006

(54) PROGRAMMATICALLY SERIALIZING COMPLEX OBJECTS USING SELF-HEALING TECHNIQUES

(75) Inventors: Feng-wei Chen Russell, Cary, NC (US); Samuel R. McHan, Jr., Apex, NC (US); William D. Reed, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 10/225,379

(22) Filed: Aug. 21, 2002

(65) Prior Publication Data

US 2004/0039964 A1 Feb. 26, 2004

(51) Int. Cl.
*G06F 9/44* (2006.01)

(52) U.S. Cl. ...................................... 717/118
(58) Field of Classification Search ........ 717/106–109, 717/118, 148, 120; 709/201–203, 229, 238, 709/248, 227, 246
See application file for complete search history.

(56) References Cited

U.S. PATENT DOCUMENTS

| | | | |
|---|---|---|---|
| 6,356,946 B1* | 3/2002 | Clegg et al. | 709/231 |
| 6,438,559 B1* | 8/2002 | White et al. | 707/103 R |
| 6,477,701 B1* | 11/2002 | Heistermann et al. | 717/108 |
| 2002/0010781 A1* | 1/2002 | Tuatini | 709/227 |
| 2003/0191803 A1* | 10/2003 | Chinnici et al. | 709/203 |
| 2004/0201600 A1* | 10/2004 | Kakivaya et al. | 345/700 |

OTHER PUBLICATIONS

Barbara Staudt Lerner, "A Model for Compound Type Changes Encountered in Schema Evolution", Mar. 2000, ACM vol. 25, Issue 1, pp. 83-127.*

* cited by examiner

*Primary Examiner*—Wei Zhen
*Assistant Examiner*—Anna Deng
(74) *Attorney, Agent, or Firm*—Marcia L. Doubet

(57) ABSTRACT

Methods, systems, and computer program products for programmatically serializing complex objects (such as JavaBeans™). In contrast to prior art techniques, a manually-specified data type mapping specification is not required as input to the serialization process. Instead, the present invention programmatically generates this type mapping, responsive to encountering run-time exceptions during the serialization process. The serialization process is therefore "self-healing". This approach is especially advantageous when serializing complex objects that may include complex data types and/or embedded objects. The programmatically-generated type mapping information is preferably used to generate a serialized version of the complex object, and can also be used during deserialization. In addition to improving serialization techniques, this type mapping information facilitates dynamic integration and transformation of data between heterogeneous formats.

18 Claims, 10 Drawing Sheets

FIG. 4

```
400
410   public class Account {
          private String accountNumber;
          private String accountType;
          private double balance = 0.00;
      }

420   public class AccountTransaction {
          private String currencyCode;
          private String transactionType;
          private double amount;
          private int checkNumber;
      }

430   public class AccountTransactions {
          protected Account account;
          protected Vector transactions;
          protected Date startDate;
          protected Date endDate;

440       public AccountTransactions() {
441           account=new Account();
442           transactions=new Vector();
443           Transactions.add(new AccountTransaction());
          }
      }
```

710 java serializer.SerializeClientObjects
720 -className com.ibm.csi.fss.AccountTransactions
730 -output e:\temp\AccountTransactions.txt
740 -method getAccountTransactions
750 -uri urn:GetTransactionsSvc
760 -ns http://www.gettransactionssvc.com/schemas/GetTransactionsSvcRemoteInterface

FIG. 8

```
800
<isd:mappings>
810  <isd:map encodingStyle="http://schemas.xmlsoap.org/soap/encoding/"
     xmlns:x="http://www.gettransactionssvc.com/schemas/GetTransactionsSvcRemoteInterface"
820  qname="x:Account"
     javaType="com.ibm.csi.fss.Account"
     xml2JavaClassName="org.apache.soap.encoding.soapenc.BeanSerializer"
     java2XMLClassName="org.apache.soap.encoding.soapenc.BeanSerializer"/>
830  <isd:map encodingStyle="http://schemas.xmlsoap.org/soap/encoding/"
     xmlns:x="http://www.gettransactionssvc.com/schemas/GetTransactionsSvcRemoteInterface"
831  qname="x:AccountTransaction"
     javaType="com.ibm.csi.fss.AccountTransaction"
     xml2JavaClassName="org.apache.soap.encoding.soapenc.BeanSerializer"
     java2XMLClassName="org.apache.soap.encoding.soapenc.BeanSerializer"/>
840  <isd:map encodingStyle="http://schemas.xmlsoap.org/soap/encoding/"
     xmlns:x="http://www.gettransactionssvc.com/schemas/GetTransactionsSvcRemoteInterface"
841  qname="x:AccountTransactions"
     javaType="com.ibm.csi.fss.AccountTransactions"
     xml2JavaClassName="org.apache.soap.encoding.soapenc.BeanSerializer"
     java2XMLClassName="org.apache.soap.encoding.soapenc.BeanSerializer"/>
</isd:mappings>
```

FIG. 9A

```
900  <?xml version='1.0' encoding='UTF-8'?>
910  <SOAP-ENV:Envelope
        xmlns:SOAP-ENV="http://schemas.xmlsoap.org/soap/envelope/"
        xmlns:xsi="http://www.w3.org/2001/XMLSchema-instance"
        xmlns:xsd="http://www.w3.org/2001/XMLSchema">
     <SOAP-ENV:Body>
       <ns1:getAccountTransactions
920      xmlns:ns1="urn:GetTransactionsSvc"
         SOAP-ENV:encodingStyle="http://schemas.xmlsoap.org/soap/encoding/">
930      <AccountTransactions
931        xmlns:ns2="http://www.gettransactionssvc.com/schemas/GetTransactionsSvcRemoteInterface"
932        xsi:type="ns2:com.ibm.csi.fss.AccountTransactions">
940        <startDate xsi:type="xsd:timeInstant">2001-10-08T12:42:29Z</startDate>
950        <transactions
             xmlns:ns3="http://xml.apache.org/xml-soap"
951          xsi:type="ns3:Vector">
952          <item
953            xsi:type="ns2:com.ibm.csi.fss.AccountTransaction">
               <currencyCode
954              xsi:type="xsd:string"/>
               </currencyCode>
               <amount
955              xsi:type="xsd:double">0.0
               </amount>
               <transactionType
956              xsi:type="xsd:string"/>
               </transactionType>
               <checkNumber
957              xsi:type="xsd:int">0
               </checkNumber>
             </item>
           </transactions>
```

FIG. 9B

```
960 <account
961  xsi:type="ns2:com.ibm.csi.fss.Account">
       <accountType
962     xsi:type="xsd:string">
       </accountType>
       <balance
963     xsi:type="xsd:double">0.0
       </balance>
       <accountNumber
964     xsi:type="xsd:string">
       </accountNumber>
     </account>
970  <endDate
971   xsi:type="xsd:timeInstant">2001-10-08T12:42:29Z
     </endDate>
   </AccountTransactions>
  </ns1:getAccountTransactions>
 </SOAP-ENV:Body>
</SOAP-ENV:Envelope>
```

PROGRAMMATICALLY SERIALIZING COMPLEX OBJECTS USING SELF-HEALING TECHNIQUES

BACKGROUND OF THE INVENTION

1. Field of the Invention

The present invention relates to computer programming, and deals more particularly with methods, systems, and computer program products for programmatically serializing complex objects (such as JavaBeans™).

2. Description of the Related Art

For data transfer in distributed computing environments, as well as for storing data persistently, it becomes necessary to convert data structures between structured object format and serialized format. One example of a complex structured object is a JavaBean™, which is an object used when writing programs in the Java™ programming language. ("Java" and "JavaBean" are trademarks of Sun Microsystems, Inc.) Other object-oriented programming languages use different names for their complex structured objects. The term "serialization" is used in the art to describe the process of taking a structured object and transforming it to a "flattened" data structure so that, for example, the contents of the structured object can be persistently stored or can be passed over a network connection in a serial or stream format. "Deserialization" then refers to the reverse process, whereby a flattened data structure is converted into structured object format.

Existing techniques for serializing structured objects require the program developer to manually specify the data mapping type information, at development time, creating a statically-specified type map which is then stored in a mapping registry. These type maps are used as input to a serializer, along with the objects to be serialized. This process is illustrated in FIG. 1, where a complex object 100 and its corresponding type map 110 are input to a serializer 120, which generates a serialized object 130 with type mapping information. This approach has a number of drawbacks, however. First, the programmer is responsible for explicitly specifying mapping information for every object that will be serialized. Complex objects may contain a number of nested objects, some of which may be nested several layers deep, and each object may contain complex data types (such as arrays or vectors). Correctly specifying the mapping information for every object is therefore very labor-intensive, tedious, and error-prone, which results in driving up the cost of providing distributed computing as well as increasing time-to-market for the applications that will use the serialized objects. Furthermore, the manual process of the prior art creates a heavy administrative burden, as any change in the structure of a previously-mapped object (i.e., an object for which a type map has been manually specified) requires the mapping information to be revised to keep it synchronized with the object's current definition.

An additional drawback of requiring a developer to manually create type mappings arises when the serialized object is to be used as input to a complex process such as a "Web service". (The term "Web service" refers to a trend that is gaining momentum in distributed computing, whereby application code can be dynamically located and accessed in a networking environment. Web services technology is also commonly referred to as the "service-oriented architecture" for distributed computing.) Typically, input messages passed to a Web service are specified using a protocol known as the Simple Object Access Protocol, or "SOAP". When a serializer generates a datastream to be passed to a Web service using SOAP encoding, the developer is required to understand the syntax, semantics, and encoding rules of the SOAP protocol and to account for these factors when creating the type mappings. This added complexity further increases the time and expense of using prior art serialization techniques.

Accordingly, what is needed are improved techniques for serializing objects.

SUMMARY OF THE INVENTION

An object of the present invention is to define improved techniques for serializing objects.

Another object of the present invention is to provide techniques for serializing objects in an automated manner.

Yet another object of the present invention is to provide techniques whereby serialization code programmatically discovers complex data types and embedded objects, and automatically provides for serializing those data types and embedded objects.

Still another object of the present invention is to provide techniques for programmatically resolving run-time exceptions encountered during serialization of objects.

Another object of the present invention is to eliminate the requirement that developers explicitly specify mapping information for serializing structured objects, as well as the requirement for manually keeping the mapping information synchronized with any changes to the structured objects.

A further object of the present invention is to provide improved techniques for supporting automated distributed computing.

Still another object of the present invention is to provide serialization techniques which facilitate programmatic interoperability between legacy code and Web services.

An additional object of the present invention is to provide automated techniques for encoding structured objects according to SOAP encoding rules.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides improved methods, systems, and computer program products for serializing complex objects. In one embodiment, this technique comprises: invoking a serialization process on an object to be serialized; encountering one or more errors during the serialization process, due to missing type mappings; programmatically resolving each encountered error; and restarting the serialization process after each encountered error is resolved.

The programmatic resolution preferably further comprises programmatically generating the missing type mappings. The programmatically generated type mappings are preferably stored in a mapping registry for subsequent use, thereby avoiding the errors during the subsequent invocation. In this latter case, the technique preferably further comprises using selected ones of the stored type mappings when the serialization process is subsequently invoked for the determined object.

The encountered errors may generate exception messages, and the programmatic resolution may further comprise: programmatically analyzing each exception message to locate a class name corresponding to the missing type mapping; performing introspection on a class having the located class name to determine type information for fields of the class; and programmatically generating type mappings for the class using the determined type information.

The object may be a JavaBean, and output of the serialization process may be a SOAP-encoded object.

In another embodiment, this technique further comprises determining a message to be deserialized, and invoking a deserialization process on the message, wherein the deserialization process uses the stored type mappings to generate an object version of the message.

The present invention will now be described with reference to the following drawings, in which like reference numbers denote the same element throughout.

BRIEF DESCRIPTION OF THE DRAWINGS

FIG. 4 shows Java code corresponding to the structure of the complex object illustrated in FIG. 3;

FIG. 7 depicts sample input parameters used to invoke the serializer of preferred embodiments;

FIG. 8 illustrates sample mappings that are programmatically generated during the serialization process, according to preferred embodiments;

FIG. 9 (comprising FIGS. 9A and 9B) depicts a SOAP-encoded message resulting from use of the present invention, where this message corresponds to the complex object illustrated in FIGS. 3 and 4;

Figure 1:
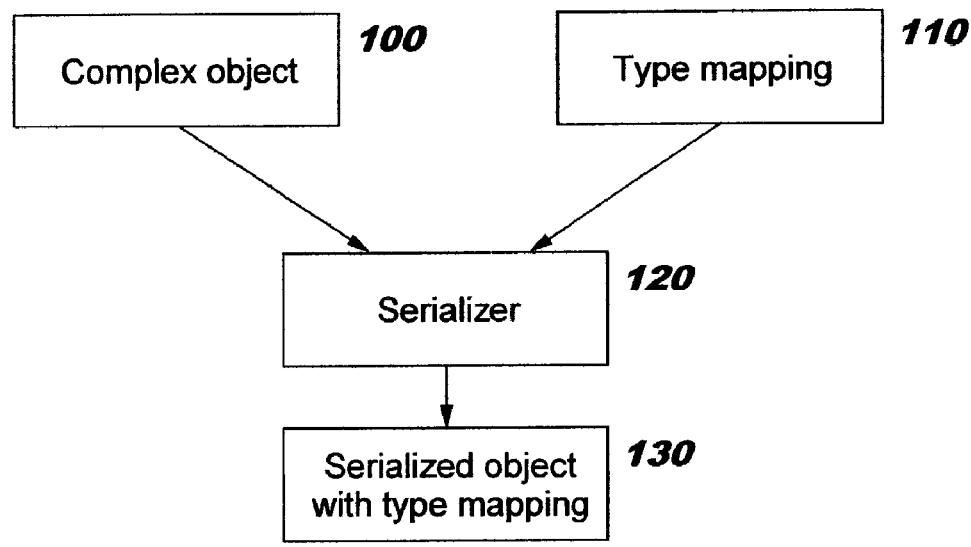
FIG. 1 illustrates an object serialization process used in the prior art.

Appendix A provides a sample Web service response message; and

Appendix B shows how the response message in Appendix A may be transformed using an embodiment of the present invention.

DESCRIPTION OF PREFERRED EMBODIMENTS

The present invention defines novel techniques for serializing objects. According to preferred embodiments, serialization is performed without requiring a programmer to identify each embedded object and without requiring the programmer to manually define type mappings for each of these objects. Instead, the embedded objects are discovered programmatically, at run-time, and mappings are programmatically created for each object. Similarly, the programmer is not required to identify each complex type within objects to be serialized, or to manually define mappings for these complex types, because preferred embodiments of the present invention programmatically create mappings for these complex types.

Exceptions generated during the serialization process are resolved programmatically, using introspection and/or reflection to analyze the serialization process. Corrective, programmatic self-healing actions are taken. That is, a "missing" type mapping that causes an exception during serialization is programmatically resolved, and the type mapping is dynamically generated. The serialization process automatically restarts, following application of the self-healing actions, continuing the serialization and programmatic resolution of exceptions in an iterative manner. Thus, the serialization process operates transparently to the end user. This is in contrast to prior art techniques, where a missing type map will generate an exception that causes the serialization process to fail, and wherein the programmer is required to manually specify the missing type map before the serializer can be restarted.

In preferred embodiments, the self-healing actions are "remembered" in order to resolve future exceptions of the same kind. That is, the programmatically-generated mappings are automatically added to a mapping registry, such that references to the corresponding object during a subsequent serialization process will no longer generate an exception.

As an added benefit, the mappings generated according to the present invention may be used when deserializing messages (i.e., when transforming flattened, or non-hierarchical, data structures back into their object format), enabling seamless integration of object-oriented client code in a service-oriented distributed computing environment. This approach also facilitates dynamic transformation of data between heterogeneous formats, and dynamic aggregation/de-aggregation of data (which may be needed, for example, when integrating client code with Web services).

When using the disclosed techniques, the programmer no longer has to manually and explicitly define every type found within an object and the objects which may be embedded therein. This programmatic serialization process not only reduces development time, it also reduces errors and removes the administrative burden of manually synchronizing changes to object definitions with mappings which have been defined for those objects—which, in turn, results in reduced support costs.

Preferred embodiments are described herein with reference to an implementation in which JavaBeans are serialized to a SOAP encoding. However, it should be noted that references to JavaBeans and SOAP encoding are provided for purposes of illustration, but not of limitation. The disclosed techniques may be used with other programming languages and other encoding formats without deviating from the scope of the present invention.

The serialized objects which are efficiently created through use of the present invention facilitate rapid deployment of network-accessible services (which, for purposes of illustration but not of limitation, are referred to herein as Web services). Structured object formats can be programmatically converted to serialized format, which may be passed directly to a Web service (or which may alternatively be transformed prior to passing to a Web service). Existing legacy client code can be seamlessly integrated with Web services using the techniques disclosed herein.

An example of using techniques of the present invention will be presented herein. This example refers to several concepts from the Web services environment. Accordingly, a brief overview of Web services will now be provided.

In general, a Web service is an interface that describes a collection of network-accessible operations. Web services fulfill a specific task or a set of tasks, and provide distributed application integration in client/server networks such as the World Wide Web. A Web service may work with one or more other Web services in an interoperable manner to carry out its part of a complex workflow or a business transaction. For example, completing a complex purchase order transaction may require automated interaction between an order placement service (i.e., order placement software) at the ordering business and an order fulfillment service at one or more of its business partners. As another example, when an on-line retailer accepts a customer's order for goods, the order completion process may include selecting a delivery service to deliver the goods to the customer, such that the customer can be provided with delivery tracking information as part of his order confirmation.

Web services are also being deployed to provide an interface into legacy applications and systems (such as relational database systems), making the legacy code more widely available for distributed computing. For example, a database query may be offered as a Web service. This database query Web service can then be accessed by clients that do not have the legacy client code installed.

Many industry experts consider the service-oriented Web services initiative to be the next evolutionary phase of the Internet. Web services enable distributed network access to software to become widely available for program-to-program operation, without requiring intervention from humans. Typically, availability of a Web service is published in a network-accessible service registry, along with a description of the service's interface. This registry may be queried to programmatically locate registered services, and the interface to the Web service can also be dynamically discovered. The registered interface information can then be used to programmatically interact with a located service.

For example, a request might be issued for locating all providers of a stock ticker service, where the requester might want to integrate this stock ticker service into his portal. The registry of services will be consulted, and a search will be performed to locate the registered services that match the requester's constraints. The requester then selects from among the available service providers, and a binding process is performed to enable the requester to use the selected Web service.

Web services are typically being designed to leverage a number of open web-based standards, such as the Hypertext Transfer Protocol ("HTTP"), SOAP and/or Extensible Markup Language ("XML") Protocol, Web Services Description Language ("WSDL"), and Universal Description, Discovery, and Integration ("UDDI"). HTTP is commonly used to exchange messages over TCP/IP ("Transmission Control Protocol/Internet Protocol") networks such as the Internet. SOAP is an XML-based protocol used to invoke methods in a distributed environment. XML Protocol is an evolving specification of the World Wide Web Consortium ("W3C") for an application-layer transfer protocol designed to enable application-to-application messaging. (XML Protocol may converge with SOAP, and therefore references herein to SOAP should be construed as referring equivalently to semantically similar aspects of XML Protocol.) WSDL is an XML format for describing distributed network services. (For more information on SOAP, refer to http://www.w3.org/TR/2000/NOTE-SOAP-20000508, titled "Simple Object Access Protocol (SOAP) 1.1, W3C Note 08 May 2000". See http://www.w3.org/2000/xp for more information on XML Protocol. More information on WSDL may be found at http://www.w3.org/TR/2001/NOTE-wsdl-20010315, titled "Web Services Description Language (WSDL) 1.1, W3C Note 15 March 2001". HTTP is described in Request For Comments ("RFC") 2616 from the Internet Engineering Task Force, titled "Hypertext Transfer Protocol—HTTP/1.1" (June 1999).)

Returning now to discussion of the present invention, when object-based client code needs to interact with a Web service, it is desirable to serialize the objects to be passed as input to the Web service so that these objects and their data can be passed to the Web service using SOAP-encoded messages. A Web service typically returns its output using SOAP message encoding as well, where the SOAP message may carry serialized object content. In such cases, it is necessary to deserialize these messages for communication back to the object-based client code.

Preferred embodiments of the present invention will now be described with reference to FIGS. 2–10.

Figure 2:
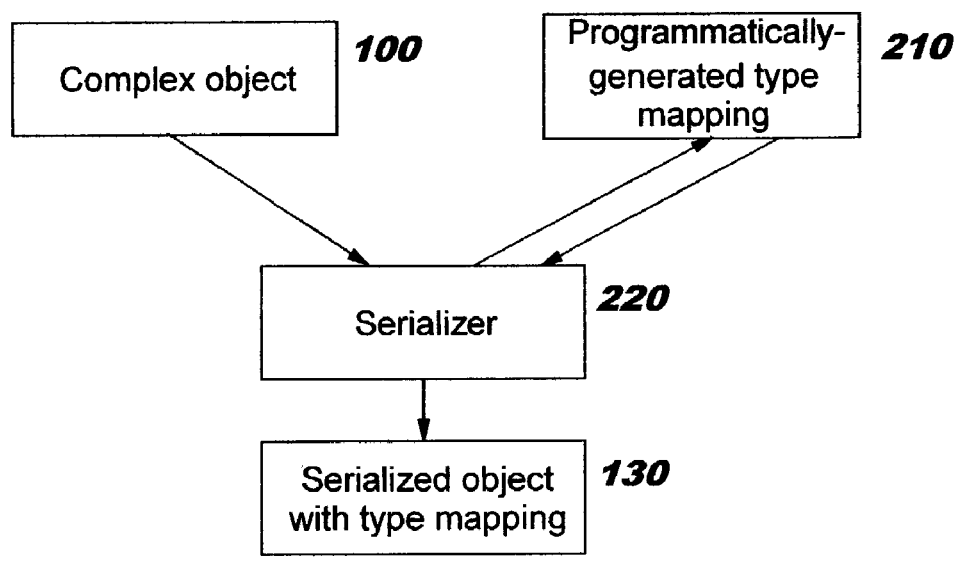
FIG. 2 shows the object serialization process, according to preferred embodiments of the present invention.

FIG. 2 illustrates how the object serialization process operates, according to preferred embodiments, in contrast to the prior art technique shown in FIG. 1. Whereas a manually-created type mapping 110 is a required input to a prior art serializer 120, the serializer 220 of preferred embodiments not only does not require this input, but it generates the type mapping 210 "on the fly", as needed to carry out a serialization. (Previously-generated type mappings may be used, in some cases, where these mappings have been stored in a mapping registry.)

Figure 3:
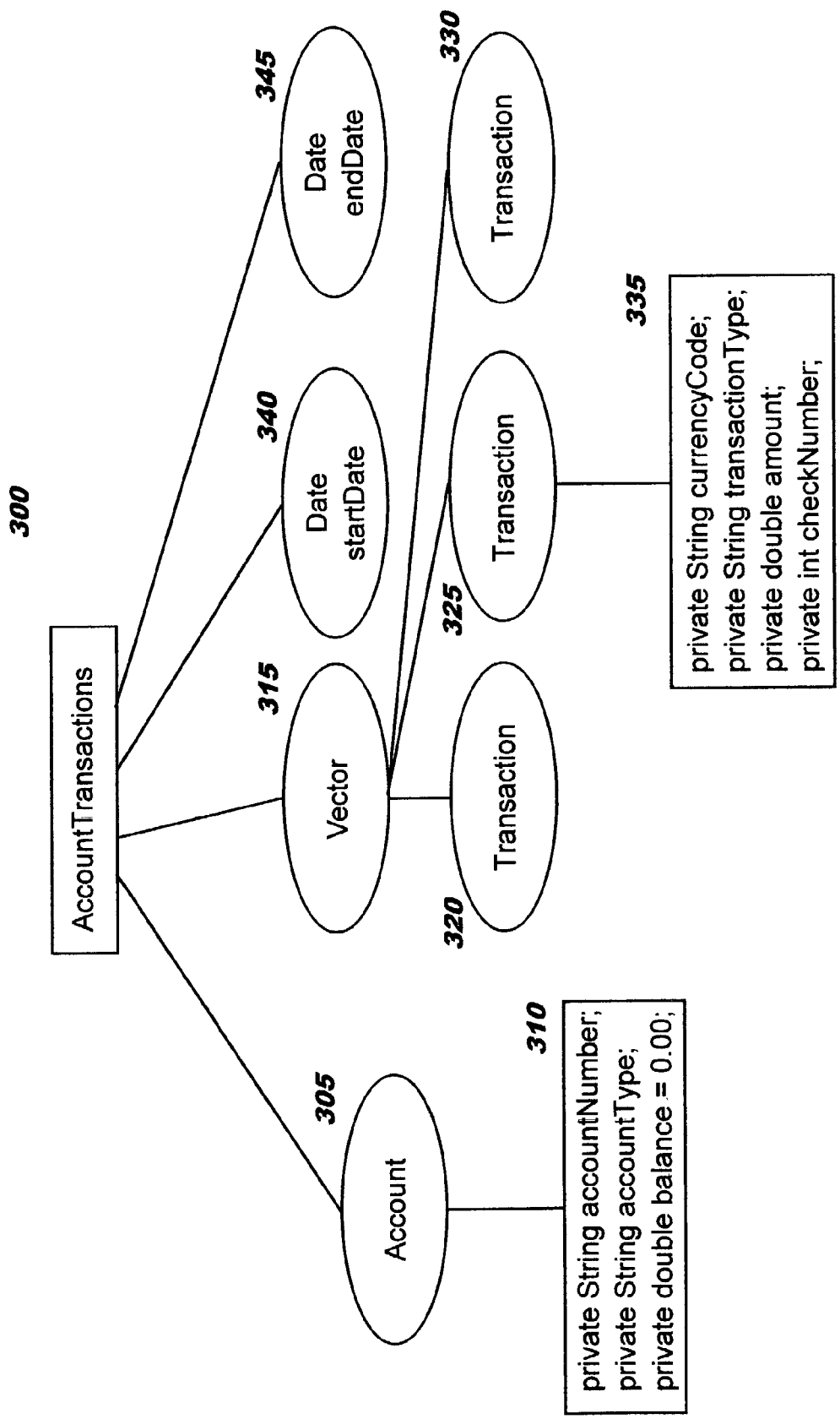
FIG. 3 is a diagram of a complex object that is used to illustrate the serialization process according to preferred embodiments of the present invention.

A sample object is depicted in FIG. 3, and will be referred to herein when describing operation of preferred embodiments. For purposes of this sample object, suppose a user at a client device wishes to see her banking account transactions during a particular time period. Using a browser or other client-side code, a request will be sent to a back-end system (as will be described in more detail with reference to FIG. 10), where the transactions for the requested time period will be retrieved from a data repository and returned for display with the user's browser/client-side code. This banking account request and its corresponding result are modeled herein using an object referred to herein as an "AccountTransactions" bean, and in this example, the server-side code that carries out the client's request is a Web service.

Referring to FIG. 3, the AccountTransactions bean is illustrated graphically as reference number 300, and contains four fields: (1) account; (2) transactions; (3) startDate; and (4) endDate. The account field has a type of Account, and is shown in FIG. 3 at 305. The account field represents an embedded object in this example. Instances of Account include an accountNumber, accountType, and a balance, as shown at 310. The transactions field is defined as a vector, and in the example, this vector 315 is shown as containing three transactions 320, 325, 330. Each transaction includes a currencyCode, transactionType, amount, and checkNumber, as shown at 335 for transaction instance 325. The startDate and endDate field both have a type of Date, as shown at 340 and 345, respectively. Values of these date fields correspond to the time period for which transactions were requested.

Sample Java code 400 defining the objects in FIG. 3 is provided in FIG. 4. The Java code at 410 specifies the structure of Account instances, corresponding to reference numbers 305 and 310 of FIG. 3. The code at 420 defines the structure of an AccountTransaction class, which is used for creating the transaction instances represented at reference numbers 320–335 of FIG. 3. The code at 430 defines an AccountTransactions class, which corresponds to reference number 300 of FIG. 3.

Finally, the code at 440 provides a sample default constructor for instances 300 of the AccountTransactions class 430. As shown therein, the account field 305 is created as an instance of the Account class 410; the transactions vector field 315 is created as an instance of the Java Vector class; and this vector 315 is populated with an instance of AccountTransaction class 420.

In the prior art, the programmer would be required to manually provide mappings for the AccountTransactions class, the AccountTransaction class used for the vector of transactions, and the Account class. According to preferred embodiments of the present invention, however, the serializer automatically discovers these classes, at run time, and programmatically provides their mappings through introspection. (While preferred embodiments are described in terms of using introspection, reflection may be used instead of, or in addition to, introspection.)

While the example shown in FIGS. 3 and 4 provides a relatively simple object structure, it illustrates use of embedded objects and complex types (i.e., the account object and the vector of transaction objects) and serves to illustrate how the techniques of the present invention provide improved serialization for objects that may, in some cases, be quite complex.

Figure 5:
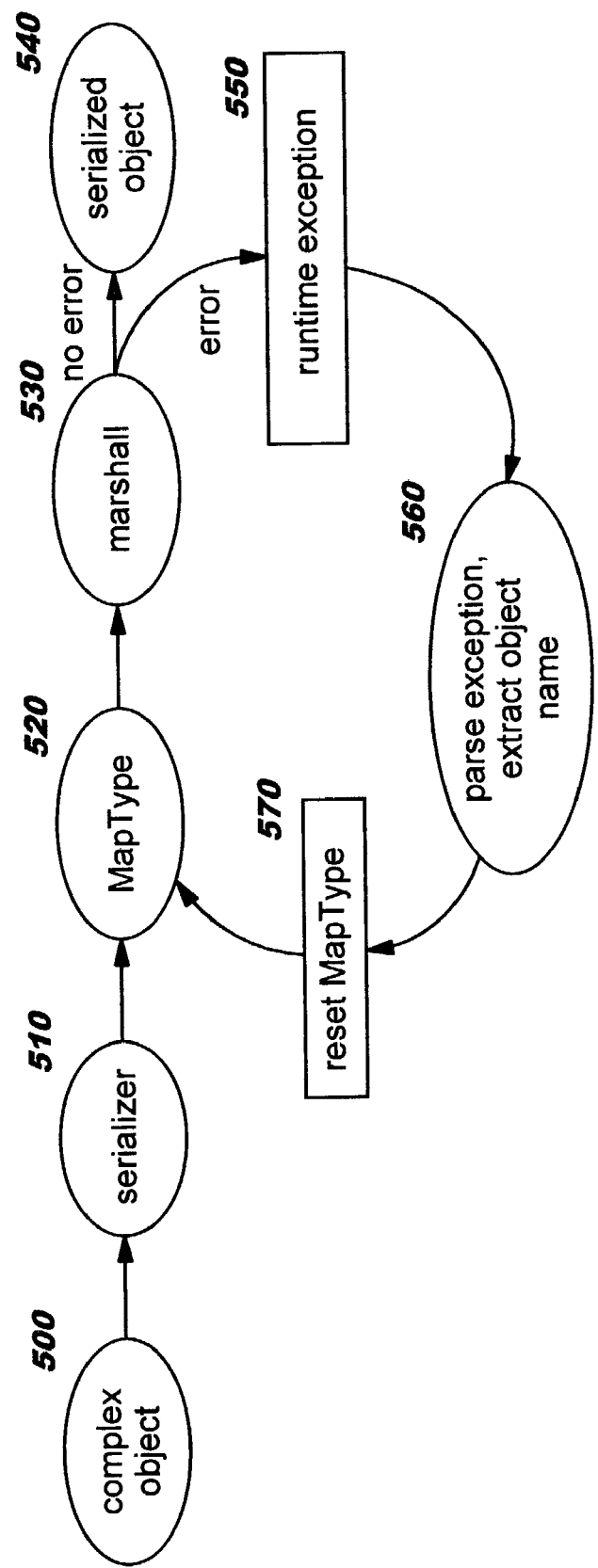
FIG. 5 provides a state diagram of the serialization process of preferred embodiments.

A state diagram illustrating the iterative, self-repairing serialization process used in preferred embodiments is shown in FIG. 5. Given an input complex object 500 to be serialized, the serializer 510 generates type mapping information 520, and an object is marshalled 530 (i.e., serialized). When an embedded object or complex type (including user-defined types, whether simple or complex) is encountered, the serializer has no mapping information to use, and a run-time exception 550 is generated. Typically, the exception handler will generate a message such as "Class_Name_xyz cannot be serialized". This exception message is parsed, and the name of the class causing the exception to be thrown is extracted 560. The type map is reset 570, and a type mapping for this class is generated 520. A recursive process is then invoked to serialize an instance of this class. Once the entire complex object has been marshalled, the result is a serialized object as shown at 540. When the complex object 500 is a JavaBean and the type mappings specify SOAP encodings, then the serialized object 540 is a serialized JavaBean encoded in SOAP XML format. (Note that although the serialization process is discussed with reference to a "complex" type, this process works equally well for objects of a simple type.)

Preferred embodiments contemplate that the serialization process depicted in FIG. 5 is invoked dynamically at run time, as a JavaBean is detected that needs to be passed as input to a Web service. However, the serialization process may also be used at development time, if desired, and furthermore it may be explicitly invoked by a developer. In this latter case, parameters to direct the serialization may be passed from a command line or script or using other means. These parameters will be discussed in more detail with reference to FIG. 7.

Note that while preferred embodiments are described herein primarily with reference to a request-side scenario, in which a JavaBean is serialized for transmission to a Web service or other request message consumer, the inventive concepts disclosed herein may also be used advantageously for deserialization. For example, if a Web service generates a response in a "flat" XML format, the present invention may be used to transform the contents of that message into hierarchical JavaBean format. Thus, discussions of serializing data are not meant to limit the scope of the present invention, and deserialization techniques that correspond to the described serialization techniques are within the scope of the present invention.

Figure 6:
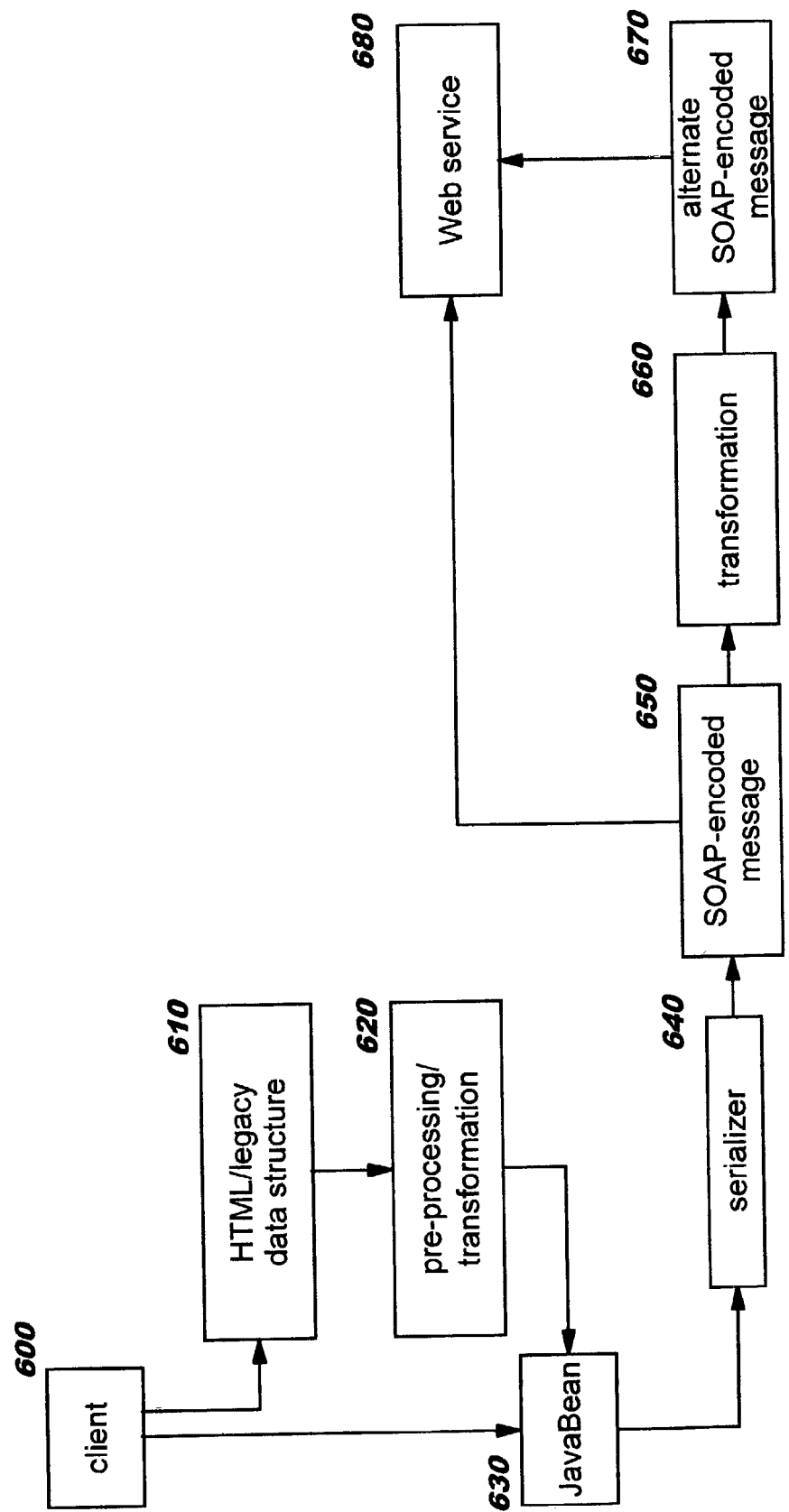
FIG. 6 shows a high-level view of the transition in data format that results from using techniques described herein.

FIG. 6 provides a high-level view of a data transformation process in which preferred embodiments may be used advantageously. Input to the serialization process 640 is a JavaBean 630. This JavaBean may be created directly by the client application 600, or it may result from pre-processing or transformation 620 of a data structure 610 generated by the client application. For example, if the client application is legacy code, then a legacy data structure may be transformed into a JavaBean by a prior art process designed to enable interaction of the legacy client with object-oriented server code. Or, if the client application is a Web browser, then it may generate an HTML form or Web page that is transformed into a JavaBean using a prior art process. (Transformation 620 may be performed at a gateway, proxy, or other network intermediary, by a Web server or application server, etc.)

The result of applying serializer process 640 to JavaBean 630 is a SOAP-encoded message 650 which contains an XML data stream (i.e., an XML document) in the message body. This SOAP message may be passed directly to a Web service 680. Alternatively, the SOAP message 650 may be passed as input to a transformation process 660, which converts the message to an alternate SOAP message form 670 required by Web service 680. As an example of the transformation process 660, a style sheet processor may be used to transform the XML document in message 650 into an alternate form by applying one or more style sheets to the document. Suppose that in the account transactions example, the client code is an object-oriented client that has been written to interact with a legacy server application executing on a Web server, but that this legacy application is now being deployed as a Web service. To enable the client application to continue operating, interfacing seamlessly (and transparently, from the client's perspective) with the Web service, a style sheet (or multiple style sheets) may be written to intercept the client requests, reformat the contents of the requests into the format required for interfacing to the Web service, and generate modified requests that can then be passed on to the Web service. (Application of style sheets by style sheet processors is well known in the art, and a detailed discussion thereof is not deemed necessary to an understanding of the present invention.)

In an alternative embodiment, transformation process 660 may be integrated with the serializer 640 such that creation of the message 650 is omitted, and message 670 is generated as a result of this integrated processing.

Referring again to FIG. 5, the process of serializing a bean at run time will now be described in more detail. The invocation of the run-time serializer at 510 is preferably triggered by receipt of a request message that is intercepted as it is transmitted along the network path from a client to a server, where this message contains a complex object 500 that needs to be serialized. In a representative run-time environment, request messages are transmitted from the client using the HTTP protocol, where the client has been configured (using prior art techniques) to direct its traffic toward a proxy. (Refer to the description of FIG. 10, below, for more details on this representative environment.) The proxy preferably uses a prior art filtering process to determine which messages should be intercepted. Typical filtering techniques include monitoring traffic for occurrence of one or more predetermined target Uniform Resource Locators ("URLs"), for particular document types contained in the request messages, for particular device types at the sending client, or for particular content types specified in the request messages.

For example, with the banking account transactions scenario represented by the sample data in FIGS. 3 and 4, suppose the client is configured to send its traffic to an address such as "www.myBankingExample.com" (or perhaps to an address such as "www.myBankingExample.com/requests.html"). The proxy may then define a URL filter such as "*myBankingExample*", where the "*" characters are used as wildcards.

Having intercepted a request message which meets the specified filtering criteria, the serializer 510 begins the serialization process. The serializer according to preferred embodiments accepts five input parameters. These include: (1) the class name of the bean to be serialized; (2) the name of an output file where the serialized result will be written; (3) the method name for the Web service to be invoked by the intercepted request message; (4) the Uniform Resource Name ("URN") or Uniform Resource Identifier ("URI") of the target service; and (5) a namespace to be used in the XML document generated by the serializer. When the serializer is invoked dynamically at run time, the class name is determined through introspection. By default, the output file is preferably a Java OutputStream instance. The remaining three parameters are preferably obtained by programmatically interrogating the WSDL document for the target Web service. (Note that the code implementing the URL filter preferably identifies the target Web service. For example, if the filter is defined to search for occurrence of "*myBankingExample*" in the request message's target URL, then the filter can be written to search for the WSDL document of a Web service such as "bankingExampleServices".)

Alternatively, when the serializer is explicitly invoked, for example by a developer or development tool as a stand-alone development-time operation, then the parameter values may be provided directly by the developer or development tool.

A set of sample input parameters for serializing the AccountTransactions bean 430 is shown at 700 in FIG. 7. Statement 710 invokes the serializer, and in this example uses a method name of "SerializeClientObjects" in a "serializer" class. The class name parameter 720 that is passed to the serializer in this example is "com.ibm.csi.fss.AccountTransactions", representing the AccountTransactions bean to be serialized (where the code for this bean's class is stored in a package in a "com.ibm.csi.fss" path). The class name is preferably a complete Java class name, as shown in the example, including the package name.

The output location parameter 730 in this example names a text file (having extension ".txt"), where the path "e:\temp\" and the extension are preferably determined from configuration data. The class name parsed from the intercepted request message is then concatenated to this path, along with the configured extension. Or, when the file does not need to be persisted, the parameter value can be omitted, and a default value (such as an instance of OutputStream class) will be used.

The method name parameter 740, URI parameter 750, and namespace parameter 760 are preferably constructed programmatically by consulting the WSDL document for the Web service to be invoked, as stated above. Or, the developer or development tool may alternatively provide this information.

The target URI name specified as URI parameter 750 is preferably used in the deployment descriptor file of the Web service as the identifier of the service. (See reference number 920 of FIG. 9.)

The namespace value specified as namespace parameter 760 is preferably used in each type mapping element that is generated by the exception-resolving self-healing process of the present invention (see reference number 820 of FIG. 8, for example) and also in the body of the SOAP envelope created for transmitting the serialized bean (see reference number 931 of FIG. 9).

Whether the serializer is invoked at development time or at run time, a minimal amount of development-time preparation is needed to enable the run-time serializer to operate. In particular, each bean to be serialized must have a default constructor defined. See FIG. 4, for example, where the default constructor for the AccountTransactions class 430 is shown at element 440. For each embedded object, the default constructor for that object must be called to initialize the corresponding complex type field in the higher-layer (i.e., embedding) object, so that the complex type field can be serialized. See element 441 of FIG. 4, where the default constructor for AccountTransactions invokes the default constructor for the Account class to initialize the "account" field. (As a result, an Account bean is created and initialized. This Account bean instance uses the class definition shown at 410.) For each complex type field (such as an array, vector, or list), the default constructor for the class containing that complex type field must initialize the complex type field to enable serialization. See element 442, where the "transactions" field is initialized by invoking the default constructor for the built-in Vector class. (As a result, a Vector bean is created and initialized.) For the array/vector/list fields, one element should be put into the field to enable the serializer to know the data type of each element in that field. See element 443, where the "add" method is invoked on the newly-created transaction vector to add a new instance of an AccountTransaction bean. (Thus, the vector contains one instance of the class as specified at 420.)

When the serializer first operates on a JavaBean that is an instance of the AccountTransactions class 300, three run-time exceptions for missing type mappings will be encountered. These exception will be for the AccountTransactions class itself, as well as for the Account class and the transactions vector. As each exception is resolved, according to the present invention, type mapping information is programmatically generated. An example of the mappings that may be generated for the example JavaBean is shown in FIG. 8, as will now be described.

The "mappings" element 800 contains a child "map" element for each mapping being generated for this JavaBean. Thus, three map elements 810, 830, and 840 are generated in the example. Note that the mappings and map tags of the example use a namespace of "isd". Each map element has six attributes. In this example, a default value is specified for the "encodingStyle" attribute where that default value identifies the SOAP encoding schema. Next, a namespace attribute is specified. According to preferred embodiments, the value of this attribute is generated 820 using the namespace parameter 760 that was input to the serialization process.

For the object to be serialized, the values of a "qname" attribute and of a "javaType" attribute are programmatically generated by appending the name of the class for which the exception was thrown to the path portion of the className input parameter 720. For the highest-level object, the class name in the example is "AccountTransactions", as shown at 841. For embedded objects and complex types, the values of these attributes are also generated by parsing the exception and locating the class name. (Refer to the discussion of FIG. 5, above.) See, for example, the class name for the complex "AccountTransaction" type at 831.

Finally, values of "xml2JavaClassName" and "java2XMLClassName" attributes are generated, preferably using a default bean serializer class.

This generated mapping information 800 is preferably stored in memory, as a mapping repository object when the Web service is invoked. Then, when the serializer next needs to serialize an instance of AccountTransactions class, the type mappings will be available and the exception generating/repairing process that occurs when first serializing an instance of this class is avoided.

The serialized JavaBean of the example scenario, encoded as a SOAP message, is shown at reference number 900 in FIG. 9. A serializer of the prior art generates this SOAP message using a complex object in combination with manually-specified type mapping information provided by the developer, as discussed above. Refer to the discussion of FIG. 1, in particular. A serializer according to the present invention generates this SOAP message in an iterative manner, introspecting each object and complex type while programmatically generating the mappings shown in FIG. 8 (provided those mappings were not previously generated and stored in the mapping registry). Refer to the discussion of FIG. 2. Accordingly, the SOAP message 900 includes type mapping information for each element of the serialized object, and the source of this type mapping information is transparent to a consumer of the message (i.e., the target Web service). Selected elements of the SOAP message 900 will now be described, in terms of a message that is generated according to the present invention.

Preferably, the header 910 of the SOAP envelope is generated in an identical manner for all messages, and defines several namespace identifiers, using prior art techniques which will not be described in detail. In the SOAP body, a top-level element 920 is generated for the Web service method that is to be invoked for the (top-level) JavaBean being serialized, and thus in the example, this element 920 is named "getAccountTransactions". A namespace attribute and encodingStyle attribute are generated, in preferred embodiments, where the namespace attribute refers to the URN 750 that was an input parameter to the serialization process and the encodingStyle attribute identifies the SOAP encoding schema.

A child element 930 is generated for the top-level class of the object being serialized, and in the example is therefore named "AccountTransactions". A namespace attribute 931 for this element is set to the value of the namespace input parameter 760, and a type attribute 932 is set to match the name of the class being serialized. Note that this value 932 matches the programmatically-generated "qname" attribute in the type mapping, where (according to preferred embodiments of the present invention) that value was determined by parsing the exception thrown when the type mapping was found to be missing. Thus, in the examples of FIGS. 8 and 9, the type attribute 932 is set to "ns2:com.ibm.csi.fss.AccountTransactions", which matches the qname attribute 841 value of "x:com.ibm.csi.fss.AccountTransactions" (noting that the namespace prefixes "ns2" and "x" both resolve to the value of the namespace input parameter 760).

A type attribute is also generated for the startDate field of the AccountTransactions class, as shown at 940, and a value of the startDate element is also specified in the SOAP message encoding of this serialized JavaBean. According to preferred embodiments, the value of this type attribute is preferably obtained using introspection on the Date class (upon determining, again using introspection, that the class being serialized contains an instance of the Date class).

Element 950 corresponds to the complex type of the example, which is a vector of transactions. The value of the type attribute for this element is therefore "Vector", as shown at 951, where this value is obtained by introspection.

An "item" element is generated for the transactions vector 950, as shown at 952. An exception will be generated when the serializer reaches the transactions field of the AccountTransactions object, and the exception will be parsed to determine that the type mapping information for the AccountTransaction class is missing. As stated earlier, preferred embodiments rely on the default constructor for the class containing each complex type field to initialize the complex type field, and in the case of a vector, to add one element to the field so that the serializer will know the data type of each element in that field when it programmatically creates type mappings. Refer to the discussion of elements 442 and 443 of FIG. 4, above. Thus, the value of the type attribute 953 for the item element 952 can be determined, as can the value of type attributes 954, 955, 956, and 957.

Similarly, the "account" element 960 is generated upon encountering an exception for this field when serializing its parent object. As stated above with reference to element 441 of FIG. 4, the default constructor for the parent object contains an invocation of the default constructor for each embedded object, facilitating the introspection of type information (and therefore the self-healing serialization) of that embedded object. Thus, the complex type field can be serialized, and the value of type attribute 961 can be determined. In addition, values for type attributes 962, 963, and 964 are determined using introspection.

Finally, an element is created for the endDate field, as shown at 970, where this element has a type attribute 971. Refer to the discussion of the startDate field 940, above, for more information.

Figure 10:
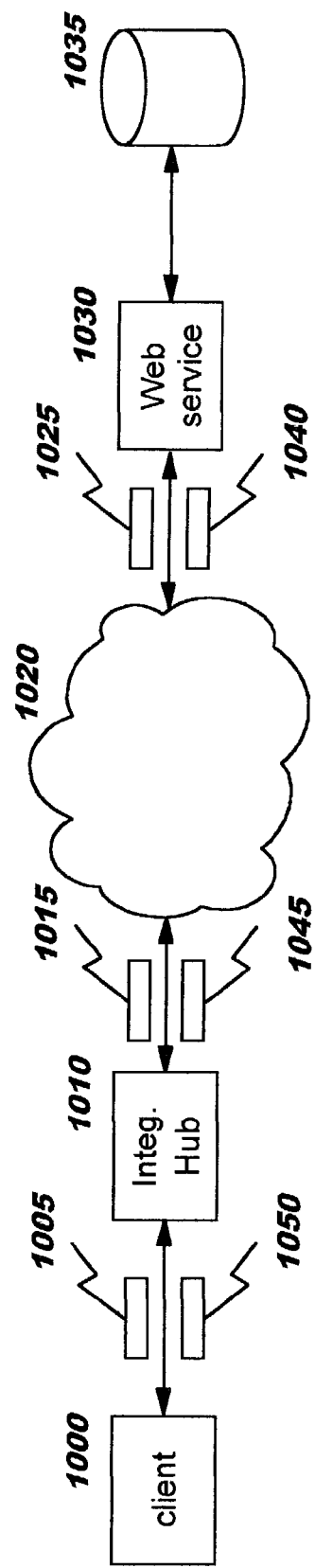
FIG. 10 illustrates a sample run-time environment in which preferred embodiments of the present invention may be used for efficiently integrating client code with Web services.

FIG. 10 illustrates a sample run-time environment in which preferred embodiments of the present invention may optionally be used for efficiently integrating client code with Web services. As shown therein, a client 1000 issues a request. Suppose, for purposes of illustration, that the request is encoded as a JavaBean and that the request message containing this JavaBean 1005 is transported using HTTP to a transformation process or "integration hub" 1010. Client 1000 is preferably configured to communicate with the integration hub as a proxy, such that all outbound requests from client 1000 pass through the integration hub. A prior plug-in operating in the integration hub inspects each packet from client 1000, searching for specific information such as a URL pattern, content type, device type, or document type, as discussed earlier. (In preferred embodiments, URL patterns are used as the search criteria, to reduce the overhead of this inspection process.)

Upon finding a matching packet, the serializer of the present invention is applied to this packet, creating a serialized JavaBean encoded in a SOAP message format. The programmatically-generated type mappings are stored in a mapping registry accessible to the client 1000. A corresponding style sheet may then be applied to this packet by the integration hub, transforming the contents of the message into a form 1015 expected by the target Web service 1030.

Message 1015 is then sent through the network 1020, 1025, and then reaches the target Web service 1030. The Web service operates on the data encoded in message 1025 (which is an XML literal version of a JavaBean), including data values set by the client for its request in message 1005. For example, in the account transactions scenario, the data in the XML literal version of the request will contain a user account number, a starting and ending date, and so forth, so that the Web service can determine which transactions should be gathered and returned in response. One or more data repositories 1035 may be accessed by the Web service as it executes, and/or one or more programs may be invoked (not shown). For example, the Web service might invoke a database process to format a database query for the account transactions of interest, where that process is then responsible for accessing the repository 1035 (i.e., the database).

When the processing to be carried out by the Web service is finished, the Web service may generate a response message formatted as a SOAP XML document. This response message is returned 1040 through the network, typically to the integration hub, as shown at 1045.

The integration hub may now apply one or more style sheets to this response message, preparing it for delivery to the client. For example, suppose that the Web service accesses a database process which returns a row having one column for "LastName" and another column for "FirstName", and the Web service formats the retrieved names into a SOAP XML response message. This response message will typically use non-hierarchical, literal XML data, but the client that issued the request may be using JavaBeans or similar structured objects. To allow the client to interface with this Web service transparently, the integration hub, upon receiving the SOAP XML response message, will locate and apply one or more style sheets to the response message, transforming into (i.e., deserializing it) into the proper complex object format.

The integration hub may also perform "aggregation" of data. That is, in cases where the target structured object uses a single data element or field, but the values for this field span multiple XML elements in the Web service response, a style sheet (or style sheets) may be used to locate the separate elements in the response message and concatenate their values. Alternatively, if an element of the response message must be split out into multiple elements for consumption by the client, the style sheet performs a "de-aggregation" process. Furthermore, the integration hub may also aggregate data values from multiple messages when preparing a response for transmitting to the client, or may de-aggregate values from one message for use in multiple messages.

A deserialization process is then invoked, according to preferred embodiments, to deserialize or unmarshal an object for transmitting 1050 to the client. This deserialization leverages the mappings that were previously created and stored in the mappings registry, as needed. In this manner, client code can efficiently integrate with server-side processes even though an implementation of the server-side process may change, and dynamic transformation of data between heterogeneous formats is facilitated.

Referring now to Appendix A, a sample SOAP XML document is provided to illustrate how a Web service might generate its output after a database query returns a number of rows of data. In this example, eight rows have been returned and have been represented by XML elements, where the element for each row is delimited by "<SvcTransactionRow>" and "</SvcTransactionRow>" tags. As can be seen by inspecting these XML elements, the data pertains to various types of transactions for a particular account number. Appendix B shows how the response message in Appendix A may be transformed by the integration hub (reference number 1010 of FIG. 10). Note that the encoding style has been changed, referring to SOAP encoding rather than XML literal encoding. The non-hierarchical data of the response message in Appendix A has also been changed into hierarchical form, as shown in Appendix B, where the format of this example aligns with the sample object structure of the example discussed herein.

As has been described, instead of terminating the serialization process or repetitively prompting a user to provide additional information as in the prior art, the techniques disclosed herein provide automated run-time serialization of complex objects, including programmatic resolution of exceptions, through introspection (and/or reflection). Developers no longer need to manually specify every embedded object and complex type. Preferred embodiments remember the objects that need to be registered, and use this information for future invocations. Thus, the technique is self-educating and has cognitive capability.

Note that reference herein to use of particular protocols is for purposes of illustration and not of limitation. Other similar protocols may be used alternatively.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

APPENDIX A

```
HTTP/1.1 200 OK
Server: WebSphere Application Server/4.0
Content-Type: text/xml; charset=utf-8
Set-Cookie: JSESSIONID=0000I4W5W3RCZMBG2L0LNVT43OI:
-1;Path=/
Cache-Control: no-cache="set-cookie,set-cookie2"
Expires: Thu, 01 Dec 1994 16:00:00 GMT
Content-Length: 5715
Content-Language: en
Connection: close
<?xml version='1.0' encoding='UTF-8'?>
<SOAP-ENV:Envelope xmlns:SOAP-ENV=
"http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns1:SvcTransactionResponse xmlns:
ns1="urn:/fseInfo/SvcTransaction.dadx"
SOAP-ENV:encodingStyle="http://xml.apache.org/xml-soap/literalxml">
<return>
<xsd1:SvcTransactionResult
xmlns:xsd1="http://localhost:
8080/FSEDemo/fseInfo/SvcTransaction.dadx/XSD">
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail<BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>-10.00</AMOUNT>
<TRANS_TYPE>DEBIT</TRANS_TYPE>
<CHECK_NO>1001</CHECK_NO>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>15.00</AMOUNT>
<TRANS_TYPE>CREDIT</TRANS_TYPE>
<CHECK_NO>1002</CHECK_NO>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
```

APPENDIX A-continued

```
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>-1249.00</AMOUNT>
<TRANS_TYPE>DEBIT</TRANS_TYPE>
<CHECK_NO>4501</CHECK_NO>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>9.00</AMOUNT>
<TRANS_TYPE>CREDIT</TRANS_TYPE>
<CHECK_NO xsi:null="true"/>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>1250.00</AMOUNT>
<TRANS_TYPE>CREDIT</TRANS_TYPE>
<CHECK_NO xsi:null="true"/>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>2251.00</AMOUNT>
<TRANS_TYPE>CREDIT</TRANS_TYPE>
<CHECK_NO xsi:null="true"/>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1     </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
```

APPENDIX A-continued

```
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>-1235255.00</AMOUNT>
<TRANS_TYPE>DEBIT</TRANS_TYPE>
<CHECK_NO xsi:null="true"/>
</SvcTransactionRow>
<SvcTransactionRow>
<ACCOUNT_NO>1</ACCOUNT_NO>
<ACCOUNT_TYPE>CMA</ACCOUNT_TYPE>
<BALANCE_AMT>300.00</BALANCE_AMT>
<BALANCE_TYPE>Avail</BALANCE_TYPE>
<SP_NAME>Federal Credit</SP_NAME>
<SP_NO>1    </SP_NO>
<SP_GROUP_NAME>ABC Bank</SP_GROUP_NAME>
<SP_GROUP_ID>1</SP_GROUP_ID>
<STREET1_NAME>123 First Avenue</STREET1_NAME>
<STREET2_NAME xsi:null="true"/>
<CITY_NAME>Anytown</CITY_NAME>
<STATE_CODE>VA</STATE_CODE>
<COUNTRY_NAME>USA</COUNTRY_NAME>
<ZIP_CODE>12345</ZIP_CODE>
<CURRENCY_CODE>USD</CURRENCY_CODE>
<AMOUNT>-1.00</AMOUNT>
<TRANS_TYPE>DEBIT</TRANS_TYPE>
<CHECK_NO xsi:null="true"/>
</SvcTransactionRow>
</xsd1:SvcTransactionResult>
</return>
</ns1:SvcTransactionResponse>
</SOAP-ENV:Body>
</SOAP-ENV:Envelope>
```

APPENDIX B

```
HTTP/1.1 200 ok
Date: Mon, 24 Sep 2001 19:25:47 GMT
Server: IBM_HTTP_Server/1.3.12 Apache/1.3.12 (Win32)
Set-Cookie: sesessionid=EWX5FZIAAAAESCI1F25ERNI;Path=/
Cache-Control: no-cache="set-cookie,set-cookie2"
Expires: Thu, 01 Dec 1994 16:00:00 GMT
content-length: 1631
Connection: close
Content-Type: text/xml;;charset=utf-8
<?xml version='1.0' encoding='UTF-8'?>
<SOAP-ENV:Envelope xmlns:SOAP-ENV=
"http://schemas.xmlsoap.org/
soap/envelope/"
xmlns:xsi="http://www.w3.org/1999/XMLSchema-instance"
xmlns:xsd="http://www.w3.org/1999/XMLSchema">
<SOAP-ENV:Body>
<ns1:getAccountTransactionsResponse xmlns:ns1="urn:
GetTransactionsSvc"
SOAP-ENV:encodingStyle="http://schemas.xmlsoap.org/soap/
encoding/">
<return
xmlns:ns2="http://www.gettransactionssvc.com/schemas/
GetTransactionsSvcRemoteInterface"
xsi:type="ns2:com.ibm.csi.fss.AccountTransactions">
<account xsi:type="ns2:com.ibm.csi.fss.Account">
<accountType xsi:type="xsd:string">ABCD</accountType>
<balance xsi:type="xsd:double">100.0</balance>
<accountNumber xsi:type="xsd:string">1234</accountNumber>
</account>
<startDate xsi:type="xsd:timeInstant">2001-09-24T15:25:47Z</startDate>
<transactions xmlns:ns3="http://xml.apache.org/xml-soap" xsi:
type="ns3:Vector">
<item xsi:type="ns2:com.ibm.csi.fss.AccountTransaction">
<amount xsi:type="xsd:double">100.0</amount>
<transactionType xsi:type="xsd:string"></transactionType>
<currencyCode xsi:type="xsd:string"></currencyCode>
<checkNumber xsi:type="xsd:int">101</checkNumber>
</item>
<item xsi:type="ns2:com.ibm.csi.fss.AccountTransaction">
```

APPENDIX B-continued

```
<amount xsi:type="xsd:double">104.0</amount>
<transactionType xsi:type="xsd:string"></transactionType>
<currencyCode xsi:type="xsd:string"></currencyCode>
<checkNumber xsi:type="xsd:int">102</checkNumber>
</item>
</transactions>
<endDate xsi:type="xsd:timeInstant">2001-09-24T15:25:47Z</endDate>
</return>
</ns1:getAccountTransactionsResponse>
</SOAP-ENV:Body>
</SOAP-ENV:Envelope>
```

We claim:

1. A computer-implemented method of programmatically serializing complex objects, comprising steps of:
    invoking, at run time, a serialization process on an object to be serialized;
    encountering one or more errors that halt the run-time serialization process, due to missing type mappings that are needed to map from the object to a serialized form thereof;
    programmatically resolving each encountered error, upon encountering each of the missing type mapping errors during the run-time serialization process, further comprising steps of:
        programmatically analyzing an exception message resulting from each encountered error to locate therein a class name indicating a class of the object for which the type mapping is missing;
        performing at least one of introspection and reflection on the class having the located class name to determine type information for fields of the class;
        programmatically generating a type mapping for the class using the determined type information; and
        using the programmatically generated type mapping for serializing the class of the object to the serialized form thereof; and
    automatically restarting the serialization process after each encountered error is resolved.

2. The method according to claim 1, wherein the object is a JavaBean™.

3. The method according to claim 1, further comprising the step of storing the programmatically generated type mappings in a mapping registry for subsequent use during the serialization process.

4. The method according to claim 3, further comprising the step of using selected ones of the stored type mappings when the serialization process is subsequently invoked for the object or for one or more other objects to be serialized, thereby avoiding the errors during the subsequent invocation for the object or the other objects.

5. The method according to claim 1, wherein output of the serialization process is a Simple Object Access Protocol ("SOAP") encoded object.

6. The method according to claim 3, further comprising the step of:
    invoking a deserialization process on a message to be deserialized, wherein the deserialization process uses the stored type mappings to generate an object version of the message.

7. A system for programmatically serializing complex objects, comprising:
    means for invoking a run-time serialization process on an object to be serialized;
    means for programmatically resolving each of one or more errors that are encountered, at run time, during the run-time serialization process and that halt the run-time serialization process, due to missing type mappings that are needed to map from the object to a serialized form thereof by programmatically invoking:

means for programmatically analyzing an exception message resulting from each encountered error to locate therein a class name indicating a class of the object for which the type mapping is missing;

means for performing at least one of introspection and reflection on the class having the located class name to determine type information for fields of the class;

means for programmatically generating a type mapping for the class using the determined type information; and means for using the programmatically generated type mapping for serializing the class of the object to the serialized form thereof; and means for automatically restarting the serialization process after each encountered error is resolved.

8. The system according to claim 7, wherein the object is a JavaBean™.

9. The system according to claim 7, further comprising means for storing the programmatically generated type mappings in a mapping registry for subsequent use during the serialization process.

10. The system according to claim 9, further comprising means for using selected ones of the stored type mappings when the serialization process is subsequently invoked for the object or for one or more other objects, thereby avoiding the errors during the subsequent invocation for the object or the other objects.

11. The system according to claim 7, wherein output of the serialization process is a Simple Object Access Protocol ("SOAP") encoded object.

12. The system according to claim 9, further comprising means for invoking a deserialization process on a message to be deserialized, wherein the deserialization process uses the stored type mappings to generate an object version of the message.

13. A computer program product for programmatically serializing complex objects, the computer program product embodied on one or more computer-readable media and comprising:

computer-readable program code for invoking a run-time serialization process on an object to be serialized;

computer-readable program code for programmatically resolving each of one or more errors that are encountered, at run time, during the run-time serialization process and that halt the run-time serialization process, due to missing type mappings that are needed to map from the object to a serialized form thereof, by programmatically invoking:

computer-readable program code for programmatically analyzing an exception message resulting from each encountered error to locate therein a class name indicating a class of the object for which the type mapping is missing;

computer-readable program code for performing at least one of introspection and reflection on the class having the located class name to determine type information for fields of the class;

computer-readable program code for programmatically generating a type mapping for the class using the determined type information; and computer-readable program code for using the programmatically generated type mapping for serializing the class of the object to the serialized form thereof; and computer-readable program code for automatically restarting the serialization process after each encountered error is resolved.

14. The computer program product according to claim 13, wherein the object is a JavaBean™.

15. The computer program product according to claim 13, further comprising computer-readable program code for storing the programmatically generated type mappings in a mapping registry for subsequent use during the serialization process.

16. The computer program product according to claim 15, further comprising computer-readable program code for using selected ones of the stored type mappings when the serialization process is subsequently invoked for the object or for one or more other objects, thereby avoiding the errors during the subsequent invocation for the object or the other objects.

17. The computer program product according to claim 13, wherein output of the serialization process is a Simple Object Access Protocol ("SOAP") encoded object.

18. The computer program product according to claim 15, further comprising computer-readable program code for invoking a deserialization process on a message to be deserialized, wherein the deserialization process uses the stored type mappings to generate an object version of the message.

\* \* \* \* \*